Patented July 24, 1934

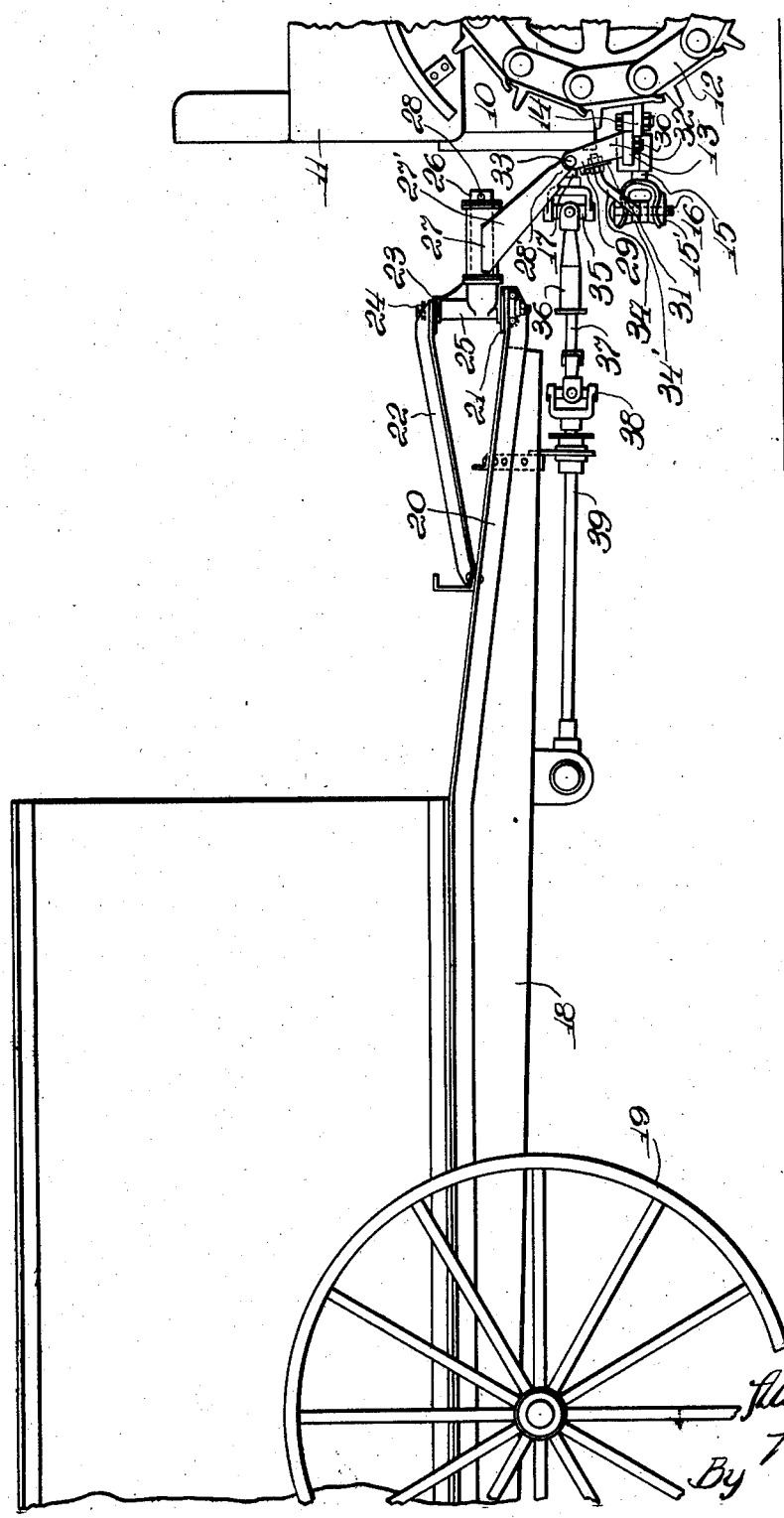

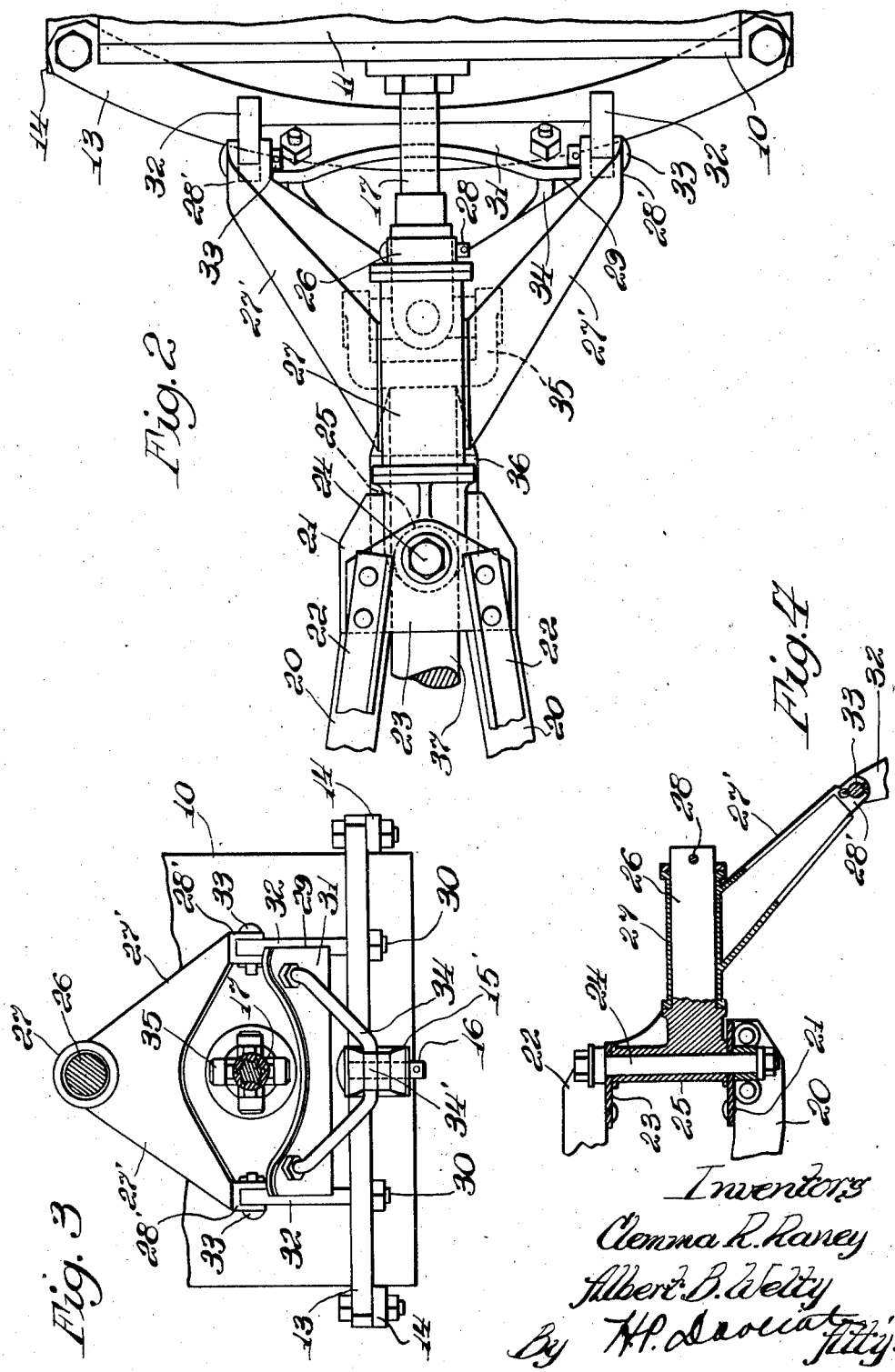

1,967,326

UNITED STATES PATENT OFFICE 1,967,326

TRACTOR HITCH

Clemma R. Raney, Riverside, and Albert B. Welty, Kenilworth, Ill., assignors to International Harvester Company, a corporation of New Jersey Application June 23, 1932, Serial No. 618,916

3 Claims. (Cl. 180—14)

This invention relates to a hitch for tractor drawn and operated implements.

A principal object of the invention is to provide an improved hitch which permits complete flexibility of the tractor with respect to the implement, that is, free pivoting or angular movement in any direction.

Another principal object is to provide, in combination with such an improved hitch, power transmitting mechanism from the tractor to the implement which is constructed to operate in a satisfactory manner in all angular positions of the tractor relative to the implement.

Another object is to provide a combined hitch and power take-off connection particularly adapted for track-laying tractors in which the drawbar is usually low and close to the tractor frame and with which very short turns are often made.

These objects and others, which will be apparent as the description proceeds, are accomplished by a construction as shown in the drawings, in which:

Figure 1 is a side elevation, showing the rear end of a track-laying tractor and the forward portion of an implement drawn by the tractor;

Figure 2 is an enlarged plan view of the hitch between the tractor and the implement;

Figure 3 is a sectional view taken on a transverse vertical plane at the rear of the connecting member 27 in the direction towards the tractor and, Figure 4 is a vertical sectional view taken through the center of the connecting member which joins the tractor to the implement.

In the drawings a portion of a track-laying tractor of a conventional construction is shown. The rear of the main frame 10, the driver's seat 11, and a portion of a track chain 12 can be seen in Figure 1. An arcuate drawbar 13, extending transversely behind the tractor, is secured by bolts at its ends to ears 14 which are mounted on the main frame 10. A longitudinally arranged drawbar 15 having a clevis 15' at its rear end is rigidly secured to the center of the drawbar 13. The clevis is provided with vertically spaced apertured portions, through which a pin 16 extends. This clevis is provided as standard equipment as a connecting means. The tractor is also provided with a rearwardly extending power take-off shaft 17, which is centrally positioned above the horizontal plane of the drawbar. Said shaft projects from the tractor frame which houses the driving mechanism, including means for driving the power take-off shaft. The drawings show a portion of a harvester thresher having a main frame 18 supported by wheels, one of which, 19, is shown. Said frame carries two forwardly extending draft members 20 which are brought together at their forward ends and rigidly secured to a member 21. Two additional bars 22, secured to the member 20 at points rearwardly spaced from their front ends, extend forwardly and upwardly at an angle with respect to the member 20. Said bars are rigidly secured to a member 23. The members 21 and 23 are provided with vertically aligned openings through which a bearing pin 24 extends.

A connecting member 25 fitted between the members 21 and 23 is formed with a vertical bore, through which the pin 24 extends. A stub shaft 26 is carried by the connecting member 25, extending substantially horizontally therefrom. Said shaft extends through a bearing sleeve or journal formed as part of a connecting or attaching frame 27. The sleeve is arranged longitudinally, that is, parallel to the line of draft. The shaft 26 is held against movement in an axial direction with respect to the sleeve by a retaining pin 28 beyond the forward end of the sleeve. The connecting frame 27, in addition to the sleeve referred to, includes two outwardly, forwardly and downwardly extending attaching arms 27'. Said arms are shaped to obtain sufficient strength and in the construction as illustrated are welded to the sleeve portion to form an integral connecting frame.

At their forward ends each of the arms 27' is formed with a pair of spaced ears 28', all of which are provided with transversely aligned openings. An attaching structure 29, secured to the drawbar 13 by threaded extensions 30, is formed with a transversely extending portion 31 and vertical portions 32, which are formed at their lower ends as the threaded extensions 30. Said vertical portions fit between the ears on the arms 27' and are provided with openings aligned with the openings in the ears. A pin 33 extends through the ears of each arm and through the corresponding portion 32, thereby securing the connecting frame 27 to the attaching structure 29 for rotation therewith about a transverse horizontal axis. As a means of bracing the transverse portion 31 of the attaching structure 29, a rod-like element 34 connected to a member 34' held in the clevis 15' by the pin 16 is rigidly secured at transversely spaced points to said transverse portion. Nuts threaded to the element on each side of the transverse member hold the elements adjustably in position.

The shaft 17 is connected to one knuckle of a double-Y type of universal joint 35. The other knuckle of said joint is secured on a short hollow shaft 36. Said shaft is slidably and non-rotatably mounted on a shaft 37 which is secured to one knuckle of a second universal joint 38. The shafts 36 and 37 can be considered as an extensible shaft and form the intermediate shaft between the driving shaft 17 and a driven shaft 39 connected to the second knuckle of the universal joint 38. The shaft 39 is rotatably mounted on the implement frame 18 by bearings carried by the downwardly depending brackets 40 and 41. Said shaft is to be connected to the mechanism of the implement, this connection not being shown.

It will be noted that the forwardly located universal joint is in close proximity to the transverse axis of the attaching frame. Said universal joint is substantially the same longitudinal distance from the vertical pivot of the draft frame on the connecting member as the rearwardly located universal joint.

In the operation of an embodiment of the invention, as illustrated, the implement is drawn over the field, draft being transmitted through the drawbar 14, the attaching structure 29, and the connecting frame 27, the connecting member 25 to the draft frame of the implement formed by the bars 22 and the draft members 20. In an unbalanced implement such as a harvester thresher there is likely to be considerable weight on the draft frame where it is connected to the tractor. For that reason, it is desirable to have the supporting pivot as close to the tractor as possible. This has been accomplished by pivoting the connecting frame 27 closely adjacent the rear end of the main frame of the tractor. This is also an important feature when using tracklaying tractors, as an excessive angle of tipping of the implement frame would result from the normal tipping of the track frame, if the draft frame of the implement were not pivoted very close to the rear portion of the track chains. As previously described, the attaching structure 29, which extends substantially vertically upward from the drawbar to form the point of attachment, is braced in that position by the rod-like element 34, which is secured to the member 34' held in the clevis 15' by the pin 16. It is therefore evident that the clevis, while being a part of a conventional drawbar, is in this construction used for bracing the supplemental draft means.

The rotation of the shaft 26 on the connecting member 25 in the sleeve portion of the connecting frame 27 takes care of the angular movement of the tractor and implement with respect to each other about a longitudinal, horizontal axis.

The vertical pivoting of the connecting member 25 on the pin 24 provides for the turning of the tractor with respect to the implement. To make a very short turn possible the vertical pivot has been purposely placed some distance behind the tractor. Inspection of Figure 2 will make clear the very short turn possible with the construction illustrated.

In the transmission of power through three shafts lying in the same plane, which may be termed the driving shaft, the intermediate shaft, and the driven shaft, connected by universal joints of the double-Y type, it is well known that, if the angular rotation of the driving shaft is uniform, the axes of the knuckles on the intermediate shaft are parallel, and the angles which the driving and driven shafts make with the intermediate shaft are equal, the driven shaft will have the same uniform rate of rotation as the driving shaft. This known action of universal joints has been taken into consideration in the design of the device of this invention. As previously stated, the universal joints 35 and 38 are placed the same distance fore and aft from the vertical pivot on the pin 24. At any degree of turn of the tractor with respect to the implement, the angle of the driving shaft 17 with respect to the intermediate shaft and the angle of driven shaft 39 with respect to the intermediate shaft will be substantially the same. It will also be noted that the shafts are all in the same horizontal plane, fulfilling that condition for the uniform transmission of torque. Of course, when the tractor tips about the transverse axis on the pin 28, this ideal condition does not exist. However, this angle is usually quite small and does not greatly affect operation.

The strain put upon a universal joint increases with the increasing angularity of the shafts connected. Angles up to 40° are usually considered practical. By the use of two joints as utilized by applicants, and by providing means for maintaining the angles of each set of shafts, equal power can be transmitted with the driving and driven shafts at 80° angle, and even somewhat greater angles, if the torque is not excessive.

Although applicants have shown and described only one preferred form of their improved hitch, it is understood that they claim as their invention all modifications falling within the scope of the appended claims.

What is claimed is:

1. A hitch for tractors comprising, in combination with the drawbar of the tractor, an attaching frame pivoted to said drawbar on a transverse axis, an implement draft frame pivoted to the attaching frame on a vertical axis, and a power drive connection including a drive shaft mounted on the tractor, a driven shaft mounted on the implement draft frame, and an intermediate shaft connected to said shafts by universal joints, said joints being positioned substantially equal distances fore and aft from the vertical pivot of the draft frame on the attaching frame.

2. A hitch for tractors comprising, in combination with the drawbar of the tractor, an attaching frame pivoted to said drawbar on a transverse axis, a connecting member pivoted to said frame on a longitudinal axis, an implement draft frame pivoted to the connecting member on a vertical axis, and a power drive connection including a drive shaft mounted on the tractor, a driven shaft mounted on the implement draft frame, and an extensible intermediate shaft connected to said shafts by universal joints, said joints being positioned substantially equal distances fore and aft from the vertical pivot of the draft frame on the connecting member, and the forward universal joint being substantially in transverse alignment with the pivot of the attaching frame on the drawbar.

3. A hitch for tractors comprising, in combination with a tractor, an attaching frame pivotally connected to the tractor on a transverse axis, a connecting member pivoted to said frame on a longitudinal axis, an implement draft frame pivoted to the connecting member on a vertical axis, and a power drive connection including a drive shaft mounted on the tractor, a driven shaft mounted on the implement draft frame, and an extensible intermediate shaft connected to said shafts by universal joints, said joints being positioned substantially equal distances fore and aft from the vertical pivot of the draft frame on the connecting member, and the forward universal joint being substantially in transverse alignment with the pivot of the attaching frame on the tractor.

CLEMMA R. RANEY.
ALBERT B. WELTY.